(12) United States Patent
Li

(10) Patent No.: US 7,084,744 B2
(45) Date of Patent: *Aug. 1, 2006

(54) SAFETY BACK-UP SENSOR FOR A VEHICLE

(76) Inventor: Shih-Hsiung Li, 2F-7, No. 23, Sec. 1, Hangchow S. Rd., Taipei (TW)

(*) Notice: Subject to any disclaimer, the term of this patent is extended or adjusted under 35 U.S.C. 154(b) by 12 days.

This patent is subject to a terminal disclaimer.

(21) Appl. No.: 10/736,795

(22) Filed: Dec. 16, 2003

(65) Prior Publication Data

US 2004/0183660 A1  Sep. 23, 2004

Related U.S. Application Data

(63) Continuation of application No. 10/081,472, filed on Feb. 22, 2002, now Pat. No. 6,693,520.

(51) Int. Cl.
*B60Q 1/00* (2006.01)

(52) U.S. Cl. .................. 340/435; 340/436; 340/901
(58) Field of Classification Search .......... 340/435, 340/436, 901, 903, 904; 293/155
See application file for complete search history.

(56) References Cited

U.S. PATENT DOCUMENTS

| 4,994,800 | A | 2/1991 | Milliken |
|---|---|---|---|
| 5,574,443 | A | 11/1996 | Hsieh |
| 5,844,471 | A | 12/1998 | Daniel |
| 6,203,366 | B1 | 3/2001 | Muller et al. |
| 6,282,969 | B1 | 9/2001 | Daniel |
| 6,340,187 | B1 | 1/2002 | Villiere et al. |
| 6,370,086 | B1 | 4/2002 | Li |
| 6,615,121 | B1 | 9/2003 | Li |
| 6,693,520 | B1 * | 2/2004 | Li .................. 340/435 |

FOREIGN PATENT DOCUMENTS

| DE | 19758075 C2 | 2/1999 |
|---|---|---|
| WO | WO 97/48578 A1 | 12/1997 |

* cited by examiner

Primary Examiner—John Tweel, Jr.
(74) Attorney, Agent, or Firm—Hedman & Costigan, P.C.

(57) ABSTRACT

A safety back-up sensor, formed with a housing having two ends and a hollow core between the two ends to accommodate a bushing and a signal sensor module. Multiple parallel longitudinal resilient tabs are formed on the housing. The resilient tabs protrude from the exterior surface of the housing and have transverse teeth to prevent the senor body from being dislodged. Longitudinal ribs may be formed on alternate resilient tabs to prevent the sensor body from rotating. With these specially designed transverse teeth and ribs, the sensor is able to counter the external rotating and shifting forces present in various driving conditions and to firmly affix the sensor to a vehicle bumper.

14 Claims, 4 Drawing Sheets

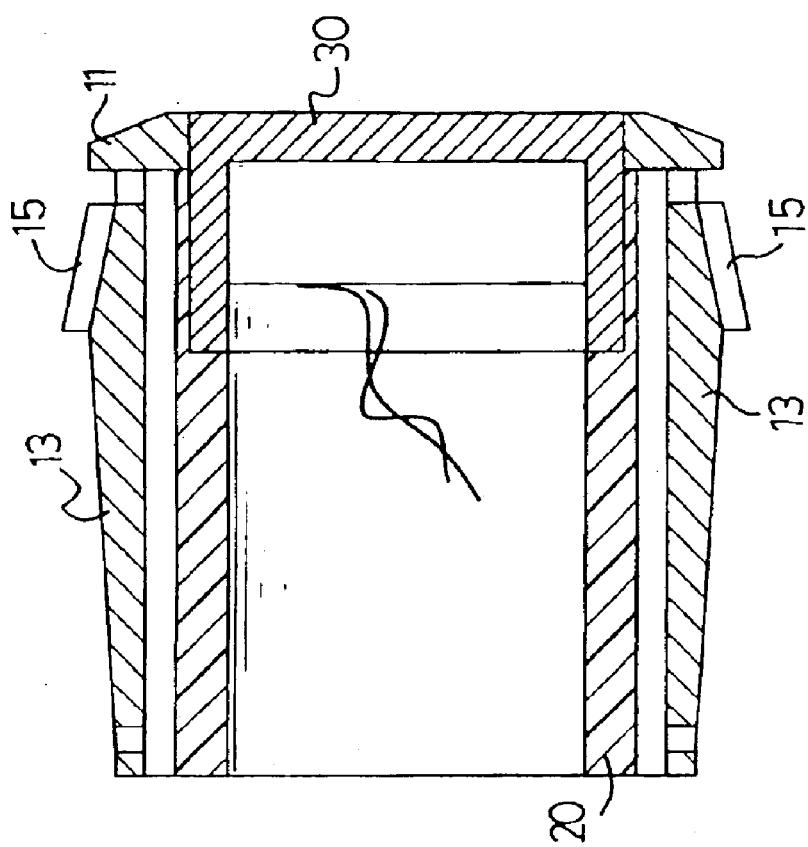
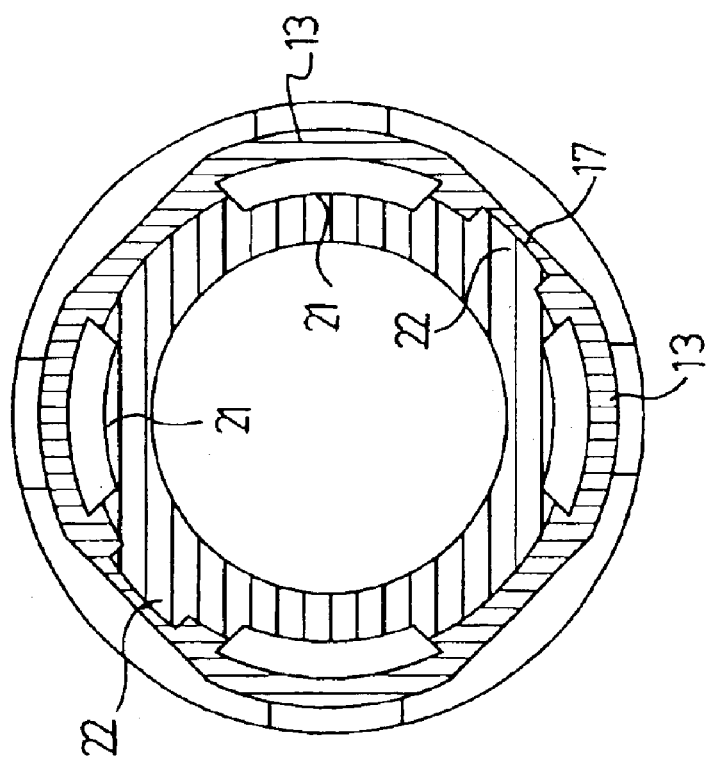

SAFETY BACK-UP SENSOR FOR A VEHICLE

REFERENCE TO RELATED APPLICATIONS

This is a continuation of U.S. patent application Ser. No. 10/081,472, filed on Feb. 22, 2002, now U.S. Pat. No. 6,693,520, dated Feb. 17. 2004.

BACKGROUND OF THE INVENTION

1. Field of the Invention

The present invention relates to a safety back-up sensor, in particular, a sensor with multiple resilient tabs on the shoulder to prevent shifting or rotation of the sensor body, allowing the sensor to be firmly affixed on a vehicle bumper.

2. Description of Related Art

When an ordinary user wants to install a sensor deice in the vehicle, his or her main consideration is the accuracy in detecting the proximity of an object. Elements causing false alarms of the electronic sensor can be either external factors or circuit design problems. The user wants to know whether the sensor device is capable of distinguishing actual objects from noises and accurately approximating the distance between the vehicle and the object, based on the reflection of ultrasonic signals emitted. A primary consideration is whether the sensor is rigidly installed in place so the device can function properly.

With reference to FIG. 5, a conventional back-up sensor device includes a cylindrical body (40), an end plate (43), a rubber bushing (41) and a signal sensor module (42). A hollow core runs through the cylindrical body (40) to accommodate the rubber bushing (41) and the signal sensor module (42). The signal sensor module (42) emits ultrasonic signals through a through hole in the cylindrical body (40) to detect any object within its effective range.

In the conventional method of installing a sensor device, a hole is drilled in the rear bumper of the vehicle, in which the sensor device is installed. When the sensor device is inserted into the bumper, the security of the installation relies on the abrasion force of the external wall of the sensor against the inner wall of the installation hole to grip the device. The external wall of a conventional sensor body (40) usually has a smooth surface. A vehicle riding over bumpy roads is likely to cause rocking, bouncing and vibration of the vehicle chassis and the bumper. Over an extended period of time, the sensor body (40) will likely loosen or become detached from the installation hole.

When assembling the conventional sensor device, the signal sensor module (42) is first inserted into the rubber bushing (41), and the rubber bushing (41) is slid into the body of sensor (40). As such, the sensor body indirectly exerts pressure on the perimeter of the signal sensor module, which may cause dislocation of the sensor leading to aberrations in signal transmission and reception. This phenomenon may well cause false alarms due to incorrect approximation of the distance between an object and the sensor device.

To overcome the shortcoming in the conventional sensor device mentioned above, the present invention provides a type of vehicle back-up sensor, wherein multiple directional and locating constructs are created on the shoulder of the external sensor body to ensure rigid installation of the back-up sensor on the vehicle bumper under all driving conditions.

SUMMARY OF THE INVENTION

The safety back-up sensor presented in this invention comprises a cylindrical body with a hollow tubular core to accommodate a rubber bushing, in which a signal sensor module is installed on one end. The shoulder of the external sensor body has multiple convex-shaped resilient tabs having the appearance of a fretted carving. The top portion of each resilient tab is impressed with transverse teeth to prevent the sensor unit from shifting. Alternately, double ribs over transverse teeth are created on every other resilient tab to prevent the sensor unit from rotating. With these special features, the sensor unit can be firmly attached to the vehicle bumper.

Other objectives, advantages, and novel features of the invention will become apparent from the detailed description when taken in conjunction with the attached drawings.

BRIEF DESCRIPTION OF THE DRAWINGS

FIG. 3 is a cross sectional side plan view of the safety back-up sensor in FIG. 2;

FIG. 4 is a cross sectional bottom plan view of the safety back-up sensor in FIG. 1;

DETAILED DESCRIPTION OF THE PREFERRED EMBODIMENT

Figure 1:
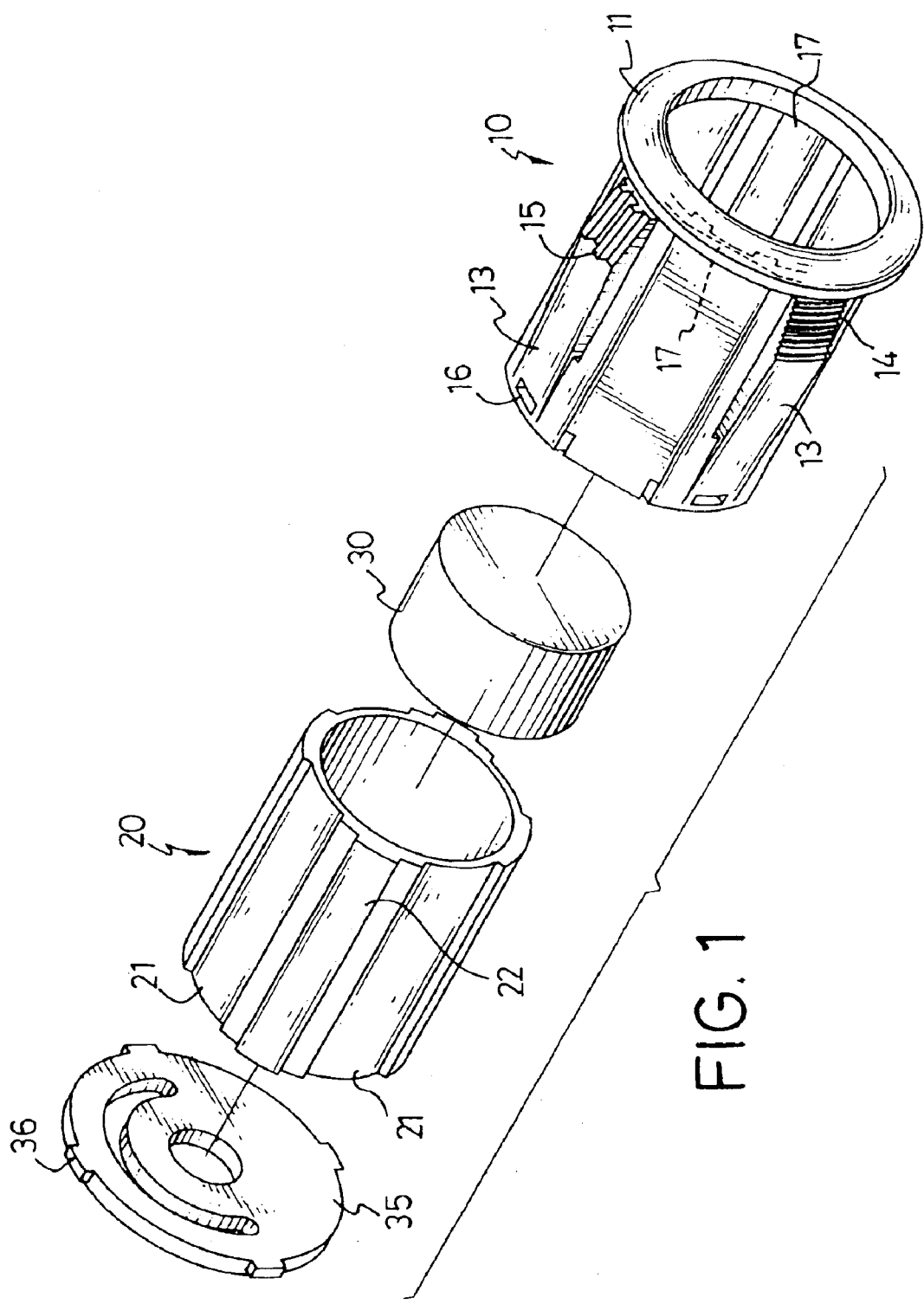
FIG. 1 is an exploded perspective view of the safety back-up sensor in accordance with the present invention.
Figure 2:
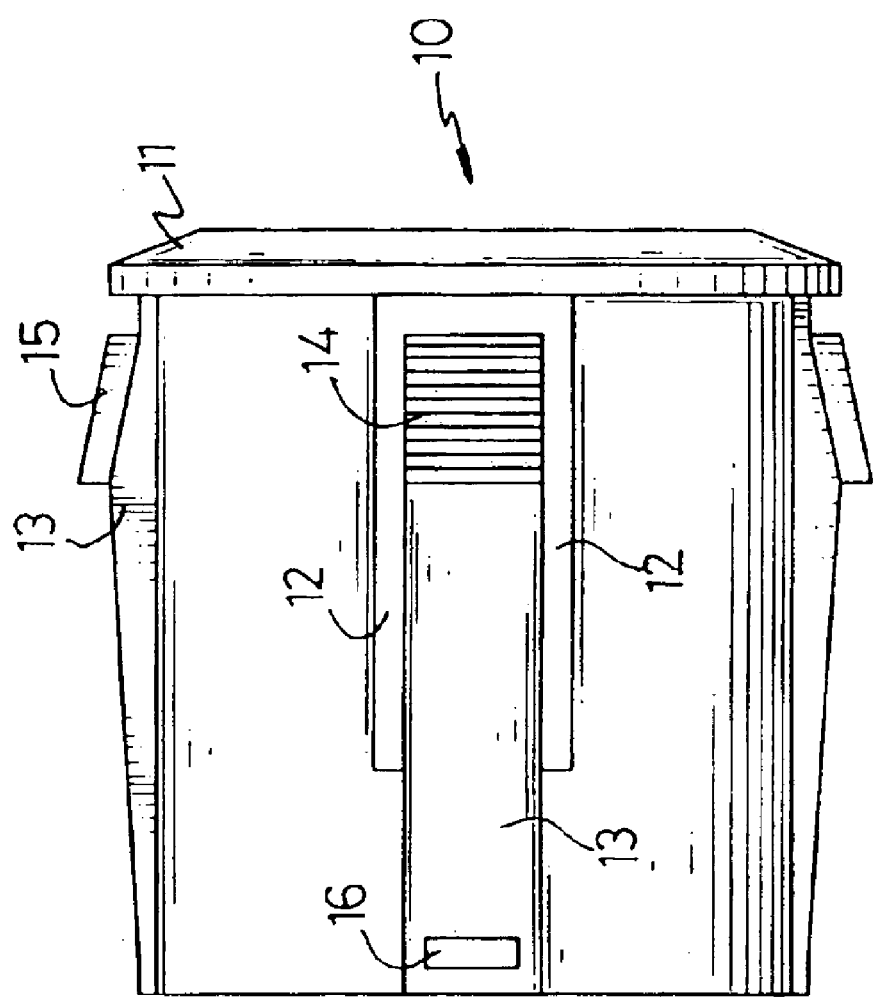
FIG. 2 is a side view of the safety back-up sensor in FIG. 1.
Figure 5:
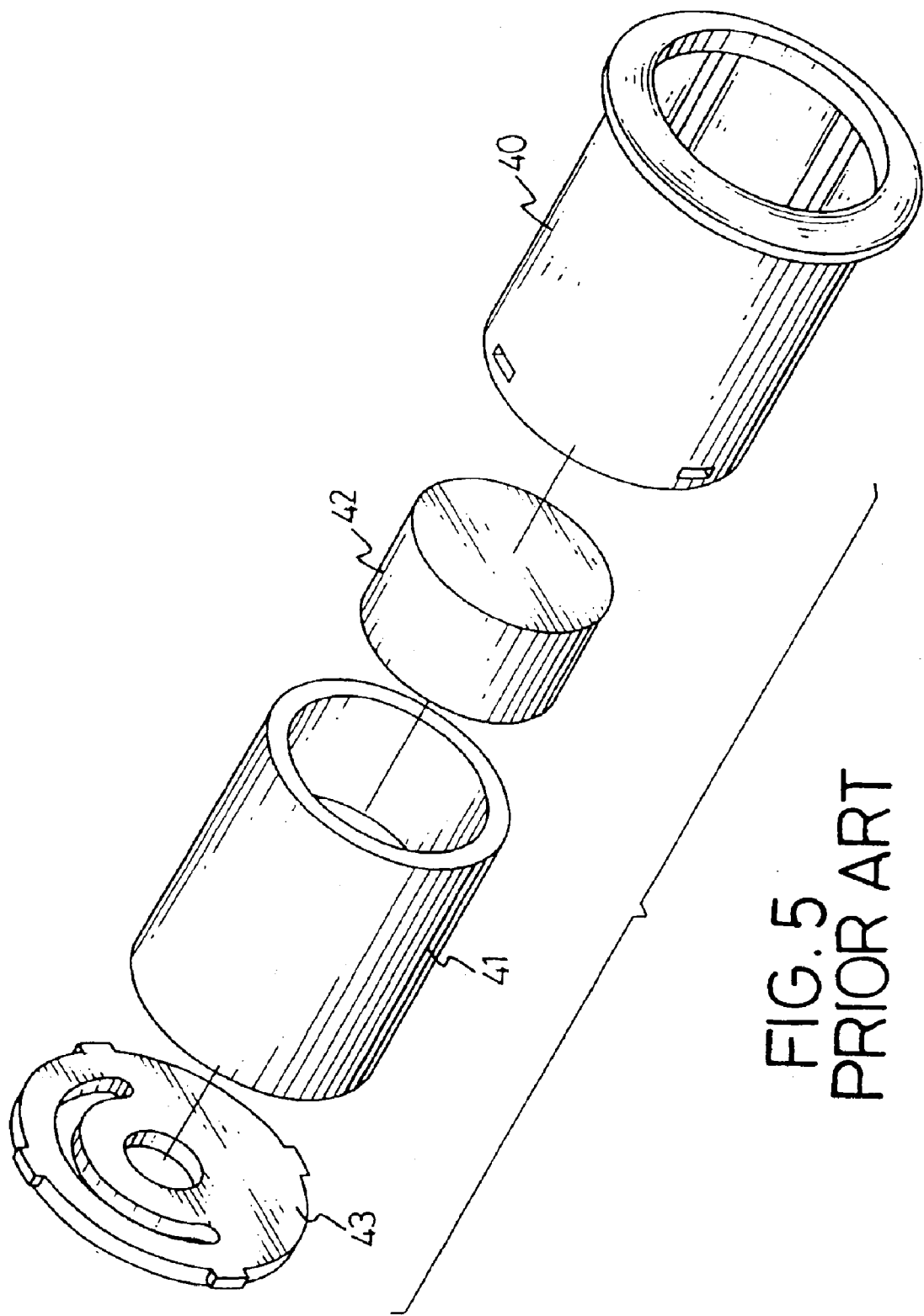
FIG. 5 is an exploded perspective view of a conventional sensor back-up device for a vehicle in accordance with the prior art.

With reference to FIGS. 1 and 2, the safety back-up sensor in accordance with the present invention comprises a cylindrical jacket (10), a rubber bushing (20), a signal-sensing transceiver (30) and an end plate (35).

The cylindrical jacket (10) has a hollow center, two open ends and an inside and outside surface. The hollow center extends to the outside through an integrated bezel (11) at one end. Pairs of parallel longitudinal through slots (12) are formed through the cylindrical jacket (10). Each longitudinal through slot (12) has two ends, and the ends of each pair is connected by a transverse through slot (not numbered) at the end adjacent to the bezel (11) to form a resilient tab (13) between each pair of longitudinal through slots (12). An outside surface of each resilient tab (13) extends out from the outside surface of the cylindrical jacket (10) in a triangular configuration. In the current embodiment four resilient tabs (13) are disposed in parallel. The parallel resilient tabs (13) extend from near one end of the cylindrical jacket (10) toward the bezel (11) but do not touch the bezel (11), thus forming a free end.

Multiple transverse teeth (14) are formed on the outside portion of alternate resilient tabs (13) toward the free end. Parallel ribs (15) are formed on the other resilient tabs (13). A rectangular engagement hole (16) is formed near the attached end of each resilient tab (13).

An axial channel (17) is formed between adjacent pairs of resilient tabs (13) on the inner surface of the jacket (10) to hold the rubber bushing (20) in place.

The external wall of the rubber bushing (20) has multiple parallel grooves (21) and multiple ridges (22). The grooves (21) correspond to the positions of resilient tabs (13) on the jacket (10). The ridges (22) correspond to the axial channels (17) on the inner surface of the jacket (10).

With reference to FIGS. 1 and 3, to assemble the back-up sensor, firstly, the signal sensor module (30) is inserted into one end of the rubber bushing (20). Secondly, the rubber bushing (20) is slid into the jacket (10). Finally, the end plate (35) is fit into the end of the jacket (10) opposite from the bezel (11) to securely hold the bushing (20) in the jacket (20). The end plate (35) has an outer edge (not numbered) with multiple locking tabs (36) corresponding to the positions of engagement holes (16) on the jacket (10). These locking tabs (36) allow the end plates (35) to be rigidly attached to the jacket (10).

With reference to FIG. 4, each ridge (22) on the rubber bushing (20) is lodged in the corresponding channel (17) on the inner wall of the jacket (10), so that the rubber bushing (20) can be firmly affixed to prevent turning of one part in relation to the other. The external wall of the rubber bushing (20) has multiple parallel grooves (21) corresponding to the positions of resilient tabs (13) on the jacket (10), so that in between the rubber bushing (20) and the jacket (10) a gap is formed. With the foregoing structure, the pressure directly applied to the signal sensor module can be reduced, thereby reducing the false alarm rate when backing up to park a vehicle.

Again referring to FIGS. 1 and 2, when the back-up sensor presented in the invention is installed on the vehicle bumper, the protruding resilient tab (13) on the cylindrical body (10) produces a strong gripping force on the inner wall of the hole used for installation of the sensor body, so that the sensor body can be firmly affixed on the vehicle bumper. In addition, the transverse teeth (14) present on the resilient tab (13) are used to further increase the abrasion force against the inner wall of the installation hole to prevent shifting of the sensor body (10), and the ribs (15) are designed to counter the rotational force on the sensor body.

The present invention provides a safety back-up sensor that can be rigidly installed in a vehicle bumper by means of and the protruding resilient tabs with transverse teeth and ribs. It is apparent that the back-up sensor with the improved body structure is capable of enhancing the efficacy in giving warning of the proximity of an object compared to conventional sensor devices.

The foregoing illustration of the preferred embodiment of the present invention is intended to be illustrative only, and under no circumstances should the scope of the present invention be so restricted.

What is claimed is:

1. A safety back-up sensor, comprising:
  a housing with two ends and an outer surface, a hollow core extending between the ends and a bezel integrally formed on one end, said housing further comprising multiple pairs of parallel longitudinal through slots through the outer surface connected by a transverse through slot at the end near the bezel to form multiple parallel resilient tabs, each said resilient tab extending from a fixed point on the housing to a free end defined by said longitudinal and transverse through slots and protruding from the outer surface of the housing, but not attached to the bezel at the free end; and
  a bushing, at least a portion of which is mounted within the housing, said bushing having a signal-sensing transceiver mounted therein.

2. The safety back-up sensor as claimed in claim 1, wherein each resilient tab is designed to be somewhat convex in shape.

3. The safety back-up sensor as claimed in claim 2, wherein the inner surface of the housing has a channel between adjacent pairs of resilient tabs, and the bushing has multiple locking ribs on an external wall, whereby the locking ribs are firmly mounted in the channels when the bushing is inserted into the housing.

4. The safety back-up sensor as claimed in claim 3, wherein the external wall of the bushing has an external wall with multiple parallel grooves corresponding to the resilient tabs on the housing; whereby a gap is created between the bushing and the housing when the bushing is inserted into the housing.

5. The safety back-up sensor as claimed in claim 4, wherein the resilient tab toward the free end has multiple transverse teeth.

6. The safety back-up sensor as claimed in claim 4, wherein the resilient tab toward the free end has multiple axial ribs.

7. The safety back-up sensor as claimed in claim 4, wherein the alternate resilient tabs have multiple ribs and transverse teeth.

8. The safety back-up sensor as claimed in claim 5, wherein an engagement hole is formed near the fixed end of every resilient tab to attach an end plate to the jacket, wherein the end plate has an outer edge with multiple locking tabs.

9. The safety back-up sensor as claimed in claim 8 wherein an engagement hole is formed near the fixed end of every resilient tab to correspond to a locking tab of the end plate, whereby the end plate is attached to the housing.

10. The safety back-up sensor as claimed in claim 7, wherein an engagement hole is formed near the fixed end of every resilient tab to attach the end plate to the housing.

11. The safety back-up sensor as claimed in claim 1, wherein the resilient tab toward the free end has multiple transverse teeth.

12. The safety back-up sensor as claimed in claim 1, wherein the resilient tab toward the free end has multiple axial ribs.

13. The safety back-up sensor as claimed in claim 1, wherein the alternate resilient tabs have multiple ribs and transverse teeth.

14. A method of installing a back-up sensor on a vehicle, said back-up sensor having a housing with a bezel on one end and one or more protrusions extending from the an outer surface of the housing, said protrusions having a leading face, a peak and a diminishing face with said diminishing face at the end near the bezel, comprising the steps of inserting the housing into an installation opening on the vehicle for receiving the housing, passing the leading face and peak of each of the one or more protrusions through the installation opening wherein the peak of each of the one or more protrusions extend a distance from the outer surface of the housing greater than the distance of the outer surface to the installation opening, and positioning the bezel against the vehicle adjacent the installation opening so that the diminishing face of each of the one or more protrusions assert a gripping force on the inner wall of the installation opening.

* * * * *